(12) United States Patent
Manchester

(10) Patent No.: US 9,695,572 B2
(45) Date of Patent: Jul. 4, 2017

(54) MANIPULATING TRENCHING APPARATUS AND METHODS

(71) Applicant: IHC Engineering Business Limited, Northumberland (GB)

(72) Inventor: Jonathan Ralph Manchester, Tyne and Wear (GB)

(73) Assignee: IHC Engineering Business Limited, Northumberland (GB)

( * ) Notice: Subject to any disclaimer, the term of this patent is extended or adjusted under 35 U.S.C. 154(b) by 0 days.

(21) Appl. No.: 14/400,047

(22) PCT Filed: May 10, 2013

(86) PCT No.: PCT/GB2013/051220
§ 371 (c)(1),
(2) Date: Nov. 10, 2014

(87) PCT Pub. No.: WO2013/167910
PCT Pub. Date: Nov. 14, 2013

(65) Prior Publication Data
US 2015/0110563 A1    Apr. 23, 2015

(30) Foreign Application Priority Data
May 10, 2012   (GB) .................................. 1208150.1

(51) Int. Cl.
*E02F 5/10*    (2006.01)
*B62D 55/065*  (2006.01)
(Continued)

(52) U.S. Cl.
CPC ............ *E02F 5/105* (2013.01); *B62D 55/062* (2013.01); *B62D 55/065* (2013.01); *B66C 3/20* (2013.01);
(Continued)

(58) Field of Classification Search
CPC combination set(s) only.
See application file for complete search history.

(56) References Cited

U.S. PATENT DOCUMENTS 3,670,514 A   6/1972  Breston et al.
4,362,436 A   12/1982 Harmstorf
(Continued)

FOREIGN PATENT DOCUMENTS

GB   2138940 A   10/1984
GB   2423778 A   9/2006
(Continued)

OTHER PUBLICATIONS

Search Report in related GB Application No. GB1208150.1, mailed Jul. 30, 2012.
(Continued)

*Primary Examiner* — Kyle Armstrong
(74) *Attorney, Agent, or Firm* — Troutman Sanders, LLP; Ryan A. Schneider

(57) ABSTRACT

Apparatus for manipulating a longitudinally extensive member comprises a main body portion, ground contacting assemblies on which said main body portion is mounted, said ground contact assemblies being operable to convey the apparatus over a ground surface, a trench cutting device, and a mounting arm depending directly or indirectly from said main body portion and having a proximal end arranged proximate said main body portion and a distal end arranged distal from said main body portion, said distal end being operatively laterally movable with respect to the main body portion between a first limit position towards a first side of the apparatus and a second limit position towards an opposite second side of the apparatus. The mounting arm is provided with a lifting device configured to lift, and/or support assembly configured to support, said longitudinally extensive member, proximate said distal end thereof. Detec-
(Continued)

tion apparatus may also be provided at or near the distal end, for determining the position of said longitudinally extensive member. A corresponding de-mounting arm may be provided at a side of the main body opposite the mounting arm.

25 Claims, 6 Drawing Sheets

(51) Int. Cl.
*B66C 3/20* (2006.01)
*B66C 23/44* (2006.01)
*B62D 55/06* (2006.01)

(52) U.S. Cl.
CPC ............... *B66C 23/44* (2013.01); *E02F 5/10* (2013.01); *E02F 5/109* (2013.01)

(56) References Cited

U.S. PATENT DOCUMENTS

| | | | | |
|---|---|---|---|---|
| 4,542,940 A * | 9/1985 | Marten | ................... | E02F 3/188 |
| | | | | 173/8 |
| 4,749,308 A * | 6/1988 | Izawa | ................... | E02F 5/105 |
| | | | | 37/309 |
| 6,193,440 B1 | 2/2001 | Pidgeon et al. | | |
| 2007/0253780 A1* | 11/2007 | Pihl | ........................... | E02F 5/04 |
| | | | | 405/184 |
| 2010/0095560 A1* | 4/2010 | Grinsted | ................. | E02F 5/104 |
| | | | | 37/352 |
| 2010/0180475 A1 | 7/2010 | Ellett | | |

FOREIGN PATENT DOCUMENTS

| | | |
|---|---|---|
| GB | 2446142 A | 8/2008 |
| IT | 1228784 B | 7/1991 |
| NL | 9201058 A | 1/1994 |
| WO | 99/54556 A1 | 10/1999 |
| WO | 9954556 A1 | 10/1999 |
| WO | 99/62763 A2 | 12/1999 |

OTHER PUBLICATIONS

International Preliminary Report on Patentability in related PCT Application No. PCT/GB2013/051220 mailed on Nov. 20, 2014.
"Trenching Robot Slices Through Seabed", Machine Design, vol. 52, No. 27, Nov. 20, 1980.
International Search Report and Written Opinion in priority application PCT/GB2013/051220 mailed Sep. 16, 2013.

\* cited by examiner

MANIPULATING TRENCHING APPARATUS AND METHODS

CROSS-REFERENCE TO RELATED APPLICATIONS

This application is a US National Stage of International Application No. PCT/GB2013/051220, filed 10 May 2013, which claims the benefit of GB 1208150.1, filed 10 May 2012, both herein fully incorporated by reference.

This invention relates to an apparatus for manipulating a longitudinally extensive member such as a pipe, cable or the like. More especially the present invention relates to an apparatus for manipulating such a longitudinally extensive member and placing the member into a trench. In embodiments of the invention, the apparatus further includes a trench cutting device for forming the trench into which the longitudinally extensive member is placed.

The apparatus of the invention is particularly, but not exclusively, suitable for placing a longitudinally extensive member into a trench in proximity to a fixed structure (or a plurality of fixed structures), notable in proximity to one or more wind turbines.

The apparatus of the present invention has particular utility in an offshore environment, that is, where the trench is formed in the seabed.

The apparatus of the invention is particularly, but not exclusively, suitable for placing a longitudinally extensive member into a trench proximate to offshore wind turbines.

BACKGROUND

Trench cutting apparatus are well known in the art and in broad terms will normally comprise a body portion and ground contacting assembly on which the body portion is mounted. The ground contacting assembly allows the body portion to move over the ground surface (such as the seabed) and may comprise skids or endless articulated tracks. In the latter case, the trench cutting apparatus may be self propelled so that it can move itself (under operator control) over the ground surface. Steering means are also conventionally provided, such as means for adjusting the angle of the endless articulated tracks with respect to a nominally vertical axis.

Depending from the main body portion, the trench cutting apparatus has a trench cutting device of which various types are known. These include jetting apparatus and chain cutters. The particular trench cutting apparatus is selected in accordance with the anticipated ground conditions.

Further, known trench cutting apparatus can include arrangements for transferring the longitudinally extensive member into the trench. The longitudinally extensive member may, for example, be initially laid adjacent to the intended path of the trench and transferred into the newly-cut trench by a suitable manipulating or handling device provided on the trenching apparatus. In other variations, the longitudinally extensive member may be paid out from suitable apparatus, but will still require proper location in the newly formed trench by means of suitable handling apparatus of the trench cutting apparatus.

Known trench cutting apparatus are very successful in laying longitudinally extensive members over relatively long and substantially straight paths, or where the trench follows a curve of relatively great radius. However, there are circumstances in which problems arise.

Notably, it has become a common requirement for trench cutting apparatus to operate effectively where the radius of curvature of the intended trench is small. This requirement is pertinent in particular with respect trenches to be formed proximate to offshore wind turbines.

In prior art trenching vehicles the requirement for a trench of small radius of curvature causes an issue with product supports provided at either end of the trench cutting apparatus which determine the points of entry and exit respectively of the longitudinal member into and out of the trench cutting apparatus. Conventionally the product supports are designed to pick up and set down the product (i.e. the longitudinally extensive member) on the centerline of the trench cutting apparatus. Where the trench has a small radius of curvature, picking up and setting down the product on the centerline of the apparatus becomes impossible.

Another problem is the need to carefully align the trench cutting apparatus over the product (i.e. over the longitudinally extensive member) to ensure that product grabs which are provided on the trench cutting apparatus are in a position (relative to the product) so that the grabs can lift the product. In short multiple cable burial activities such as inter-array cables on offshore wind farms it is important that the trench cutting apparatus is capable of quickly loading the product to improve cycle time. Conventional trench cutting apparatus do not achieve sufficiently quick loading times.

A further problem with conventional trench cutting apparatus is the requirement to displace (typically to pivot or "butterfly") the trench cutting device so that it moves out of the path of the longitudinally extensive member as the longitudinally extensive member is lifted into the trench cutting apparatus. Thus fouling of the trench cutting device by the longitudinally extensive member is avoided (as is damage to said member) but a delay to operations is thereby introduced.

Another problem lies in is the inability of the conventional trench cutting apparatus to reverse along the longitudinally extensive member, around bends, to a fixed structure from which the longitudinally extensive member extends. The fixed structure is typically a wind turbine base or foundation and, of course, may be one of several such bases in a wind farm. The longitudinally extensive member may in this case be a power or control cable or the like. The requirement for such reversing derives from the need to start trench cutting as close as possible to the fixed structure thereby to maximise the amount of the longitudinally extensive member buried by the trench cutting apparatus. That is, trenching should optimally start from as close as possible to the fixed structure, in order to minimise the requirement for additional protection of the portion of the longitudinally extensive member which cannot be buried in the trench.

The present invention seeks to overcome or at least moderate of alleviate some or all of the above described problems.

The present invention further seeks to provide a trench cutting apparatus capable of operating where the radius of curvature of the intended trench is relatively small.

The present invention further seeks to provide a trench cutting apparatus whereby the longitudinally extensive member can be safely and effectively mounted to the apparatus when the radius of curvature of the intended trench, into which it is intended that the longitudinally extensive member be laid, is relatively small.

Still further the present invention seeks to provide a trench cutting apparatus with which the longitudinally extensive member can be mounted to the apparatus without interference from, and without interfering with, the trench cutting device of said apparatus.

Still further the present invention seeks to provide a trench cutting apparatus which is capable of approaching closely to a fixed structure, such as a wind turbine base, while moving in a reverse direction whereby trenching can commence close to said fixed structure.

Further again, the present invention seeks to provide a trench cutting apparatus capable of following a longitudinally extensive member located on a ground surface, said member defining a path including relatively small radius curves, and more especially when said apparatus is moving in the reverse direction that is in a direction opposite to that associated with trench cutting operations).

BRIEF SUMMARY OF THE DISCLOSURE

According to a first aspect of the present invention there is provided apparatus for manipulating a longitudinally extensive member comprising a main body portion, ground contacting assemblies on which said main body portion is mounted, said ground contacting assemblies being operable for conveying the apparatus over a ground surface, a trench cutting device, and a mounting arm depending directly or indirectly from said main body portion and having a proximal end arranged proximate said main body portion and a distal end arranged distal from said main body portion, said distal end being operatively laterally movable with respect to the main body portion between a first limit position towards a first side of the apparatus and a second limit position towards an opposite second side of the apparatus and wherein lifting device configured to lift, and/or a support assembly configured to support, said longitudinally extensive member are mounted on said mounting arm proximate said distal end thereof.

The ground contacting assemblies may be connected to a source of motive power, such that the apparatus may propel itself over the ground surface by operation of the motive power source and the ground contacting assemblies. Alternatively the ground contacting assemblies may be passive in that they have only a supporting role rather than a propelling role. In this case, motive power is provided by other means. For example, for underwater use, the apparatus may be provided with thrusters, or, the apparatus may be towed by a tractor, a surface vessel or other suitable means. It is preferred that the apparatus of the invention is self-propelled.

In some preferred embodiments a detection apparatus for determining the location of the longitudinally extensive member is provided on said mounting arm.

In some preferred embodiments the apparatus further comprises a de-mounting arm depending directly or indirectly from said main body portion opposite said mounting arm and having a proximal end arranged proximate said main body portion and a distal end arranged distal from said main body portion, said distal end being operatively laterally movable with respect to the main body portion between a first limit position towards a first side of the apparatus and a second limit position towards an opposite second side of the apparatus and wherein lifting device configured to lift, and/or a support assembly configured to support, said longitudinally extensive member are mounted on said de-mounting arm proximate said distal end thereof.

In the immediately preceding embodiments preferably a detection apparatus for determining the location of the longitudinally extensive member is provided on said de-mounting arm.

Preferably the detection apparatus for determining the location of the longitudinally extensive member is selected from the group comprising visual apparatus such as a camera, audio apparatus such as sonar, an inductive apparatus such as search coils and magnetic apparatus.

In some preferred embodiments, in use of the apparatus the longitudinal member is arranged to pass through or below the main body portion and substantially vertically above the trench cutting device. It is also preferred that as the longitudinally extensive member passes through or below the main body portion at least a portion thereof (in particular, at least the portion directly above the trench cutting device) is aligned with a centre line of the apparatus.

In some preferred embodiments the trench cutting device is movable between a stored position in which it is spaced from the ground surface and one or more use positions in which the trench cutting device is operable to form a trench.

In some preferred embodiments the trench cutting device when in any use or stored position lies on a straight line between a portion of the trench located below the main body portion and the position below or in the main body portion in which the longitudinal member is located in use. The term trench includes, according to context, either or both an actual trench as cut by the apparatus of the invention, or a prospective trench which would be cut were the apparatus to commence trenching operations in its current given location.

In some preferred embodiments the lifting device comprises a grab, hook or the like which is configured to engage and lift the longitudinal member.

In some preferred embodiments the support assembly is movable between a use position in which the support assembly is configured for supporting the longitudinally extensive member and a non-use position in which the support assembly does not interfere with the operation of the lifting device. In preferred variations of these embodiments the support assembly comprises at least a first sub-assembly which is pivotally mounted to the mounting arm (to the demounting arm, as appropriate) such that the sub assembly is pivotable about at least a first pivot axis between a starting non-use position in which support elements mounted on the sub-assembly are retained above the longitudinal member to a use position wherein the support elements are in a supporting configuration below the longitudinally extensive member. In further preferred variations, a second sub assembly depends pivotally by a second pivot axis from the first sub assembly, the support elements being mounted on the second sub-assembly and the second pivot axis being orthogonal to the first pivot axis. In this arrangement, pivoting of the first sub-assembly about the first pivot axis brings the support elements into a second non-use position beside the longitudinally extensive member and subsequent pivoting of the second sub-assembly about the second pivot axis brings the support elements into a supporting configuration below the longitudinally extensive member. In a further variation, second support elements are provided. When the (first) support elements adopt the supporting configuration or the second non-use position, the second supporting elements adopt a position which is configured to provide lateral positional control of the longitudinally extensive member. The second support elements preferably depend from the first sub-assembly and thus are retained in a non-use position above the longitudinally extensive member with the first sub-assembly in the starting non-use position.

In some preferred embodiments the support assembly comprises a low friction surface configured for contacting the longitudinally extensive member. Preferably the low friction surface represents one or more surfaces of said support elements or second support elements In some preferred embodiments the support assembly comprises one or more rollers which support the longitudinally extensive member. Preferably said support elements and further preferably said second support elements comprise rollers.

In some preferred embodiments the mounting arm is mounted at its proximal end by a pivot, whereby the mounting arm can operatively move with respect to the main body portion about a nominally vertical axis. In preferred variations said pivot is proximate, and preferably lies on, the centre line of the apparatus.

In further preferred embodiments the de-mounting arm is mounted at its proximal end by a pivot, whereby the de-mounting arm can operatively move with respect to the main body portion about a nominally vertical axis. In preferred variations said pivot is proximate, and preferably lies on, the centre line of the apparatus.

According to a second aspect of the present invention there is provided a method of manipulating a longitudinally extensive member, the method comprising:
(i) providing a trenching apparatus comprising a main body portion, ground contacting assemblies on which said main body portion is mounted, said ground contacting assemblies being operable for conveying the apparatus over a ground surface, a trench cutting device, and a mounting arm depending directly or indirectly from said main body portion and having a proximal end arranged proximate said main body portion and a distal end arranged distal from said main body portion;
(ii) locating said trenching apparatus over said longitudinally extensive member;
(iii) moving said mounting arm so that the distal end thereof is disposed directly above said longitudinally extensive member; and
(iv) using said mounting arm to manipulate said longitudinally extensive member into a desired position with respect to said trenching apparatus.

In some preferred embodiments the mounting arm is provided with apparatus for determining the location of the longitudinally extensive member and the step of moving said mounting arm includes determining the location of the longitudinally extensive member using said apparatus for determining the location of the longitudinally extensive member.

In preferred embodiments, said mounting arm is pivotally attached at its proximal end to the main body portion and said step of moving said mounting arm comprises moving the mounting arm about the pivot about a nominally vertical axis.

In some preferred embodiments the mounting arm is provided with a lifting device and the step of manipulating the longitudinally extensive member includes engaging the longitudinally extensive member by said lifting device and lifting the longitudinally extensive member with the lifting device.

In some preferred embodiments the step of manipulating the longitudinally extensive member includes the step of lifting the longitudinally extensive member and moving said mounting arm such that the distal end of the mounting arm and the longitudinally extensive member carried by the mounting arm are aligned with a centre line of the trenching apparatus.

In some preferred embodiments the step of manipulating the longitudinally extensive member includes lifting the longitudinally extensive member along a path configured to prevent contact or interference between the longitudinally extensive member and the trench cutting device. Preferably said path is non-linear. Notably, the trench cutting device is not moved to avoid contact or interference with the longitudinally extensive member as the member is lifted.

In some preferred embodiments the step of manipulating the longitudinally extensive member includes lifting said longitudinal member from an initial position on the ground surface to a use position where the distal end of the mounting arm and the longitudinally extensive member carried by the mounting arm are aligned with a centre line of the trenching apparatus, the lifting path of the longitudinally extensive member between said initial and use positions being configured to prevent contract or interference between the longitudinally extensive member and the trench cutting device.

In some preferred embodiments the method further comprises providing on said mounting arm a support assembly configured for supporting said longitudinally extensive member the support assembly being movable between a use position in which the support assembly is configured for supporting the longitudinally extensive member and a non-use position in which the support assembly does not interfere with the operation of the lifting device, and moving the support assembly from said non-use position to said use position when the longitudinally extensive member has been lifted by lifting device.

In preferred embodiments the trenching apparatus further comprises a de-mounting arm depending directly or indirectly from said main body portion opposite said mounting arm and having a proximal end arranged proximate said main body portion and a distal end arranged distal from said main body portion, the method further comprising moving said de-mounting arm so that the distal end thereof is disposed directly above said longitudinally extensive member; and using said de-mounting arm to manipulate said longitudinally extensive member into a desired position with respect to said trenching apparatus.

In preferred embodiments, said de-mounting are is used in steps corresponding to those employing the mounting arm. Such steps may preferably be contemporaneous with the corresponding use of the mounting arm, most especially simultaneous therewith According to a third aspect of the present invention there is provided a method of laying a longitudinally extensive member in a trench comprising identifying the location of a longitudinal member on a ground surface, moving a mounting arm of a trenching machine to a lifting position and lifting the longitudinally extensive member with the mounting arm, adjusting the position of the mounting arm such that the lifted part of the longitudinally extensive member is aligned with a centre line of the trenching machine, cutting the trench with trench cutting device mounted on the trenching machine and depositing the longitudinally extensive member in the trench.

According to a fourth aspect of the present invention there is provided a method of laying a longitudinally extensive member in a trench comprising identifying the location of a longitudinal member on a ground surface, moving a forward mounting arm of a trenching machine to a lifting position and lifting a forwardly extending portion of the longitudinally extensive member with the forward mounting arm, moving a rearward mounting arm of a trenching machine to a lifting position and lifting a rearwardly extending portion of the longitudinally extensive member with the rearward mounting arm, adjusting the position of the respective mounting arms such that the lifted part of the longitudinally extensive member is aligned with a centre line of the trenching machine, cutting the trench with trench a cutting device mounted on the trenching machine and directing the longitudinally extensive member in the trench with said rearward mounting arm.

A Preferably in the third and fourth aspects said lifting position is determined by use of detection apparatus for determining the location of the longitudinally extensive member.

According to a fifth aspect of the invention there is provided an apparatus for manipulating a longitudinally extensive member comprising a main body portion, ground contacting means on which said main body portion is mounted, said ground contacting means being operable for conveying the apparatus over a ground surface, trench cutting means, and a mounting arm depending directly or indirectly from said main body portion and having a proximal end arranged proximate said main body portion and a distal end arranged distal from said main body portion, said distal end being operatively laterally movable with respect to the main body portion between a first limit position towards a first side of the apparatus and a second limit position towards an opposite second side of the apparatus and wherein a detection apparatus for determining the location of the longitudinally extensive member is provided on said mounting arm.

Preferably in this fifth aspect lifting means configured to lift, and/or support means configured to support, said longitudinally extensive member are mounted on said mounting arm proximate said distal end thereof.

BRIEF DESCRIPTION OF THE DRAWINGS

For a better understanding of the invention and to show how the same may be carried into effect, reference will be made, by way of example only, to the following drawings, in which.

DETAILED DESCRIPTION

Figure 1:
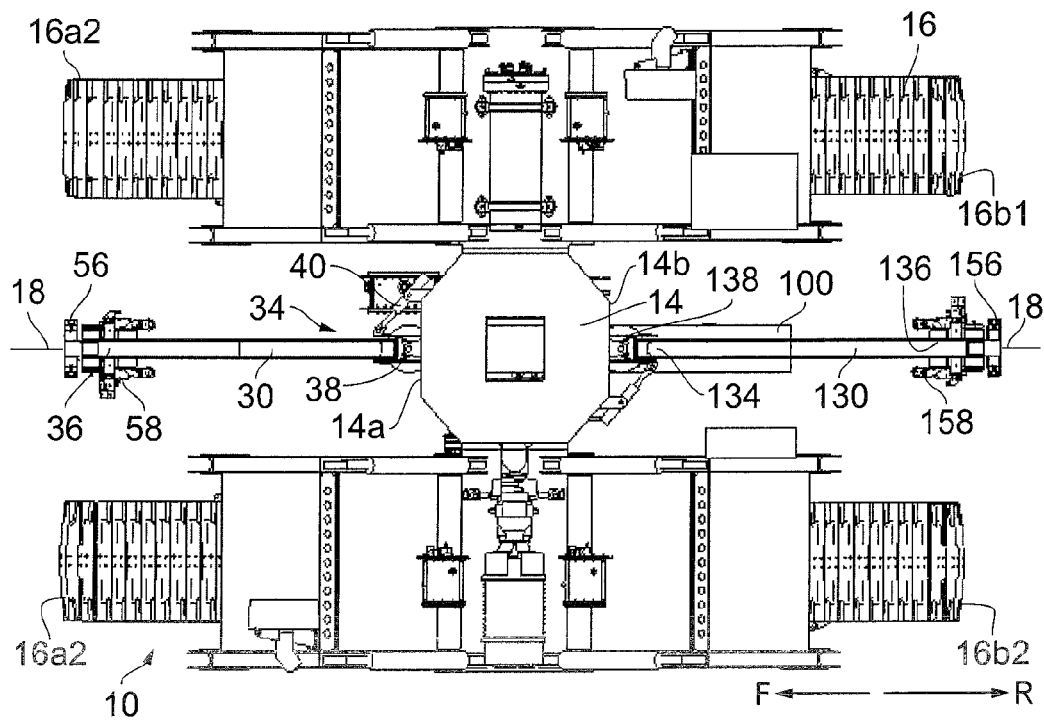
FIG. 1 is a plan view of an apparatus according to the invention with respective mounting arms arranged along the centre line of the apparatus.
Figure 2:
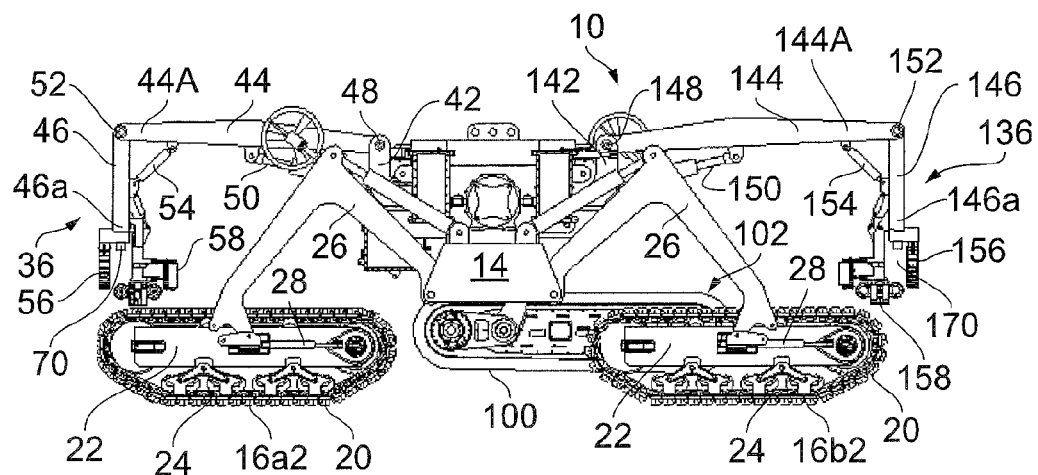
FIG. 2 is a side view of the apparatus of FIG. 1.

Referring now to the drawings there is shown apparatus 10 for manipulating a longitudinally extensive member. Apparatus 10 comprises a main body portion 14 which is supported by a plurality of ground contacting assemblies 16.

In the illustrated examples, four such ground contacting assemblies 16 are shown, which may be designated as a first pair (16a1, 16a2) and a second pair (16b1, 16b2). For convenience, the first pair (16a1, 16a2) may be regarded as the forward pair and the second pair (16b1, 16b2) may be regarded as the rearward pair.

The ground contacting assemblies 16a1 and 16b1 are arranged at a first side of the main body portion 14 and the ground contacting assemblies 16a2 and 16b2 are arranged at an opposite second side of the main body portion 14. Preferably the ground contacting assemblies 16a1 and 16a2 are equidistantly spaced from a centre line 18 of the apparatus 10 and the ground contacting assemblies 16b1 and 16b2 are also equidistantly spaced from the centre line 18 of the apparatus 10.

Centre line 18 is defined as a straight line passing through the centre of main body portion 10 and extending parallel to the direction of travel of the apparatus 10 when the ground contacting assemblies are arranged in a "straight forward" condition such that the apparatus pursues a linear path. Thus the centre line longitudinally bisects the apparatus 10.

In use of the apparatus 10, most preferably the longitudinally extensive member passes through the apparatus 10 between the ground contacting assemblies 16a1, 16a2 and between the ground contacting assemblies 16b1, 16b2 and ideally substantially in alignment with the centre line 18.

In preferred embodiments, the respective ground contacting assemblies 16 are in the form of endless articulated tracks (sometimes known as "Caterpillar" tracks) 20. Endless articulated tracks are well known to the person skilled in the art and need not be described further here.

Each ground contacting assembly 16 is steerable. That is, each ground contacting assembly 16 can be moved in a horizontal plane to change its orientation with respect to main body portion 14. Steering mechanisms for the ground contacting assemblies 16 are per se also well known to the person skilled in the art.

In the illustrated example, each endless track 20 is mounted around a track body 22 on which are mounted a plurality of carrying wheels 24 which engage the endless track 20. Track body 22 is mounted to a sub-frame 26 and can move with respect to the sub-frame 26 in a horizontal plane (for example about a pivot providing a nominally vertical axis of rotation) under the action of a suitable actuation arrangement, such as hydraulic rams 28.

The respective ground contacting assemblies 16 may be independently steerable in some embodiments. In other, more preferred, embodiments the ground contacting assemblies 16 are arranged in pairs for steering purposes. Thus for steering movements of the apparatus 10, the forward pair (16a1, 16a2) operate in unison with one another and the rearward pair (16a2, 16b2) operate in unison with one another.

The ground contacting assemblies 16 are preferably coupled to suitable drive arrangements so that the apparatus 10 can execute forward and rearward motion. In the illustrated example, the drive arrangements cause movement of the endless articulated tracks 20 about an endless path, in known manner.

In order to cut or excavate a trench (within which trench the longitudinally extensive member is to be laid) the apparatus 10 is provided with a trench cutting device 100. In the figures, the trench cutting device is shown as of the chain cutter type. Such types of trench cutting device are, as such, well known in the art and need not be described further. Depending on local ground conditions, other types of trench cutting devices, as known in the art, may be used.

In the Figures, trench cutting device is shown in a raised, non-use position. For trench cutting operations, end 102 of trench cutting device 100 is lowered until the device 100 reaches a suitable trench cutting orientation.

It is noted that the trench cutting device is arranged at a central part of the apparatus 10, so that the centre line bisects the trench cutting device 100. Preferably the trench cutting device is attached to the main body portion 14. In this way, the trench as cut is aligned with the longitudinally extensive member as the longitudinally extensive member passes through the apparatus 10.

Each respective track body 22 of the ground contacting assemblies 16 is pivotally attached to its respective sub-frame 26 and each respective sub-frame 26 is pivotally connected to main body portion 14, in each case about a nominally horizontal pivot axis. A suitable actuator such as a hydraulic actuator is disposed between each sub-frame 26 and the main body portion 14. In this way the vertical distance between each ground contacting assemblies 16 and the main body portion 14 can be adjusted in order for example to maintain the correct operational angle of the trench cutting device 100 when the apparatus is passing over uneven ground. Also, this arrangement allows the depth of the trench which is cut to be varied.

The apparatus according to the invention further comprises a mounting arm 30 and, most preferably, a de-mounting arm 130.

Mounting arm 30 is mounted on the main body portion 14 at a forward side 14a thereof. Mounting arm 30 has a proximal end 34 and a distal end 36. Mounting arm 30 extends generally forwardly of main body portion 14. Thus distal end 36 is disposed furthest from the main body portion 14 in a generally forward direction. Proximal end 34 is disposed adjacent to the main body portion 14 and is most preferably coupled, directly or indirectly, to the main body portion 14.

Mounting arm 30 is constructed so that distal end 36 can execute a side-to-side motion. That is, distal end 36 can move to positions either side of centre line 18.

In a preferred embodiment, and as illustrated, proximal end 34 of the mounting arm 30 is mounted to the main body portion 14 at a pivot, such that the mounting arm 30 is able to rotate about a nominally vertical axis of the pivot. Thus, by such rotation about the pivot, distal end 36 of mounting arm 30 is able to move, for example in a "sweeping" action to positions either side of the centre line 18.

Movement limiters in the form of stops or the like may be provided to limit the extent to which the distal end 36 can move away from the centre line 18. Whereas on the one hand the widest possible range of movement of the distal end 36 is desirable, on the other hand it is essential that the distal end 36 of the mounting arm 30 does not move so far from the centre line 18 that it may interfere with the operation of other components of the apparatus 10, such as the ground contacting assemblies 16.

Movement of mounting arm 30 to positions either side of the centre line 18 is effected by one or more suitable actuators. These may be of known type. In the illustrated embodiments, the actuator may comprise a hydraulic actuator 40 which is coupled to the mounting arm 30 and to the main body portion 14 near to the proximal end of the mounting arm 30.

Mounting arm 30 may be of unitary construction, for example being formed as a single metal component. However, in preferred embodiments, further articulation of the mounting arm 30 is provided, to provide movement of the distal end 36 in further planes. In particular, further articulation of mounting arm 30 is provided to facilitate raising and lowering of mounting arm 30 and more particularly to facilitate raising and lowering of distal end 36 of mounting arm 30.

In the illustrated example, mounting arm 30 comprises three principal segments. A first segment 42, located nearest to the main body portion 14 depends directly from pivot 38. First segment 42 is connected to a second segment 44 which is arranged forwardly of the first segment 42.

First segment 42 and second segment 44 are connected at pivot 48 such that second segment 44 can move with respect to first segment 42 about a nominally horizontal pivot axis, the effect of such movement being to raise and lower the forward end 44a of second segment 44. Movement of second segment 44 with respect to first segment 42 is effected by means of a suitable actuator, such as a hydraulic actuator 50.

Second segment 44 is connected at forward end 44a to mounting arm third segment 46. This segment 46 extends generally downwardly with respect to second segment 44. Second segment 44 and third segment 46 are connected at pivot 52 such that third segment 46 can move with respect to second segment 44 about a nominally horizontal pivot axis, the effect of such movement being to move leading end 46a of third segment 46 generally forward and backward along an arc in a nominally vertical plane. Movement of third segment 46 with respect to second segment 44 is effected by means of a suitable actuator, such as a hydraulic actuator 54.

Depending from leading end of mounting arm 30 are a lifting device 56 and support assembly 58.

Lifting device 56 includes a grab or similar device 60 which, when required, engages and holds the longitudinally extensive member so that the longitudinally extensive member can be lifted on raising of the distal end 36 of the mounting arm 30. As can be seen, for example, in FIG. 6, grab 60 comprises two pairs of curved arms 60a, 60b which can be disposed on opposed sides of the longitudinally extensive member and then closed about the longitudinally extensive member by moving the respective pairs 60a, 60b towards one another.

Support assembly 58 is provided on distal end 36 of mounting member 30 to support the longitudinally extensive member in the raised position.

Support assembly 58 comprise at least a contacting surface for the longitudinally extending member arranged in use below the longitudinally extensive member and on which contacting surface the longitudinally extending member rests and is supported. Such a contact surface may usefully be a low friction surface, or may comprise the surface of one or more rollers. Where the contact surface is constituted by more than one roller, the rollers are mounted in such a way as to ensure each roller shares the product load (i.e. the load of the longitudinally extensive member) equally.

In preferred embodiments, the support assembly 58 also provides lateral positional control of the longitudinally extensive member. For this purpose, the support assembly may desirably include side contact surfaces which can be arranged at respective sides of the longitudinally extensive member to prevent or limit lateral movement of the longitudinally extensive member. The side contact surfaces may usefully be of a low friction material or may advantageously comprise the surface of one or more rollers.

A particular advantage of embodiments of the present invention is that the support assembly 58 can be moved between a use position and a non-use position. In the use position the support assembly is in a configuration effective to support the longitudinally extensive member as outlined above. However, when such use position is adopted by the support assembly 58 the effective use of the lifting device 56 is precluded (at least when the longitudinally extensive member lies on the ground surface). Hence, the support assembly 58 is movable to a non-use position in which the support assembly 58 does not interfere with the operation of the lifting device 56.

Figure 10:
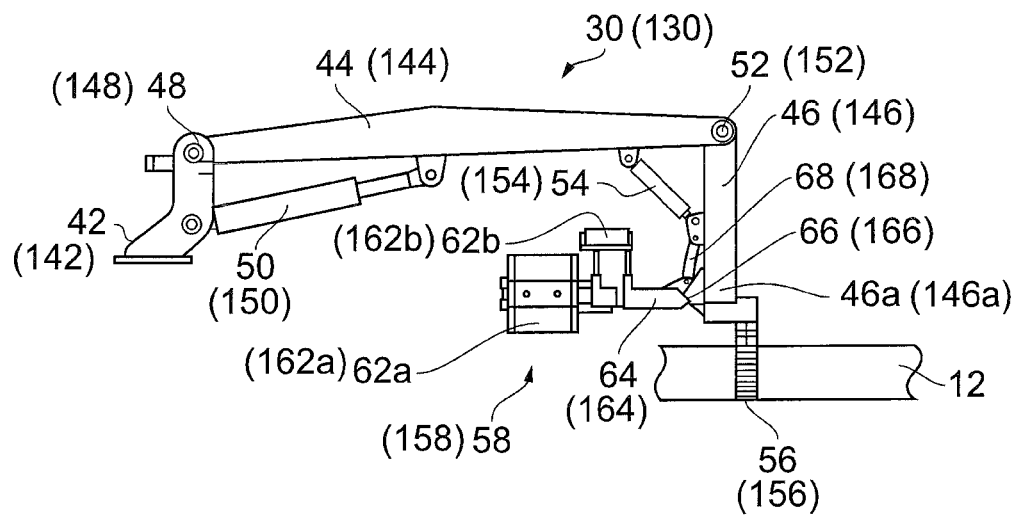
FIG. 10 shows a mounting arm with a support assembly in a first non-use position.
Figure 11:
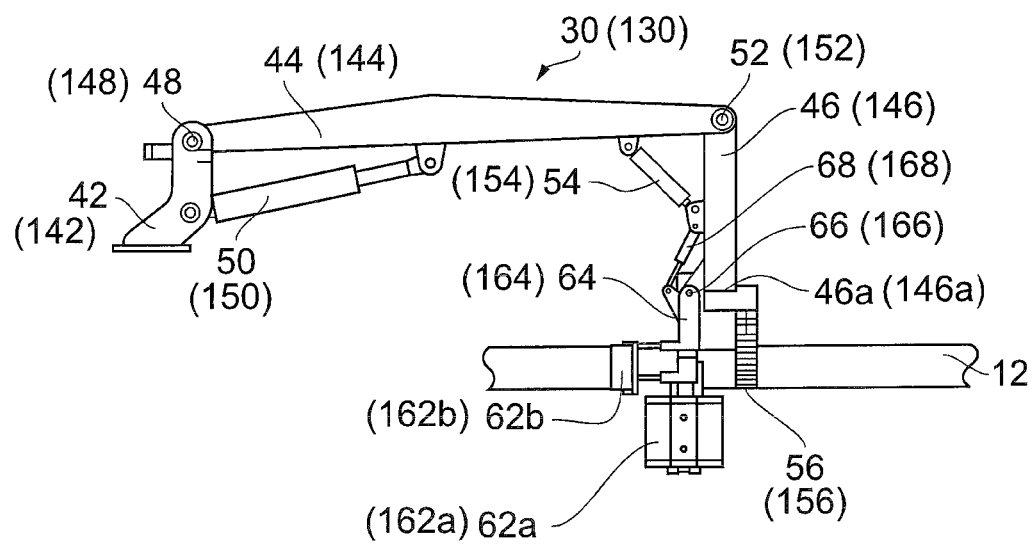
FIG. 11 shows a mounting arm with a support assembly in a first non-use position.
Figure 12:
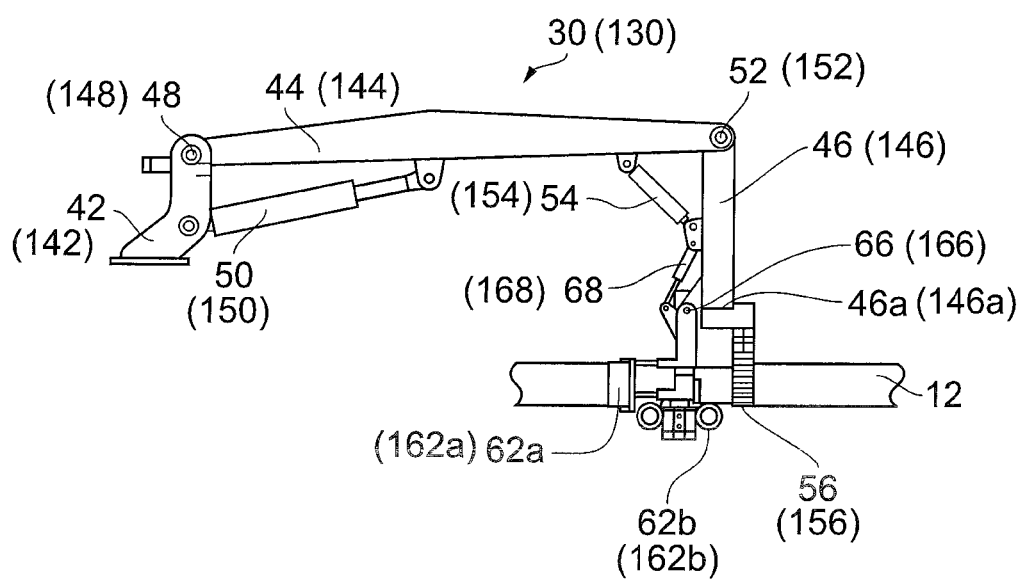
FIG. 12 shows a mounting arm with a support assembly in a use position.

An embodiment of the support assembly 58 and lifting device 56 is shown in more detail with reference to FIGS. 10, 11 and 12.

FIGS. 10 to 12 show in more detail a mounting arm 30 with its three segments 42, 44 and 46. Attached towards the leading (lower) end of third segment 46 are lifting device 56 and support assembly 58.

Support assembly 58 comprises, in this embodiment, rollers 62, arranged as a first set 62a and a second set 62b. Rollers 62 are mounted on a roller arm 64 which is attached at pivot 66 to third segment 46 of mounting arm 30. Roller arm 64 pivots about a nominally horizontal axis parallel to the axes of pivots 48 and 52. Roller arm 64 is moved about the pivot by a suitable actuator such as hydraulic actuator 68.

FIG. 10 shows the support assembly 58 in a non-use position. Support assembly 58 is in a raised position. Typically in this position the roller arm 64 is disposed approximately perpendicularly to third segment 46 of mounting arm 30. Thus, in the non-use position the rollers 62 are held above the path of the longitudinally extensive member 12 when the longitudinally extensive member is held by the lifting device 56. Thus the support assembly is retained in a position in which the rollers 62 cannot obstruct or interfere with the operation of the lifting device when the lifting device is required to engage and lift the longitudinally extensive member 12, such as from a ground surface.

FIG. 11 shows support apparatus 58 in an intermediate position. As compared to FIG. 10, actuator 68 has extended thereby moving roller arm 64 about pivot 66 to a lowered position.

In the particular embodiment illustrated in FIG. 11, the roller arm 64 is arranged approximately vertically. In the lowered position, roller arm 64 is approximately parallel to third segment 46 of mounting arm 30.

In the lowered intermediate position of the support assembly 58, the rollers 62b are arranged on respective sides of the longitudinally extensive member 12. The rollers 62b are thus positioned to control and/or limit lateral movement of the longitudinally extensive member 12.

In the intermediate position shown in FIG. 11, the rollers 62a are not in a position in which they can support the longitudinally extensive member 12. In order to bring the rollers 62a into their final use position, a further rotation of the roller set 62a about a nominally horizontal axis (with respect to the position of the rollers 62a in FIG. 11) is effected, so that the roller set 62a lies beneath the longitudinally extensive member and can perform its intended function of supporting the longitudinally extensive member 12. This final use position of the roller sets 62a 62b, and hence of the support assembly 58, is shown in FIG. 12.

It is noted that with the longitudinally extensive member 12 supported by the supporting assembly 58, as illustrated in FIG. 12, the height of the longitudinally extensive member with respect to the ground surface can be adjusted by movement of the mounting arm 30.

It is further noted that with the longitudinally extensive member 12 supported by the supporting assembly 58, as illustrated in FIG. 12, the lateral position of the longitudinally extensive member 12 with respect to the apparatus 10 can be adjusted by lateral movement of the mounting arm 30, such as about pivot 38 in the illustrated embodiments.

As noted above, the apparatus according to the invention comprises a mounting arm 30 and, most preferably, a de-mounting arm 130. De-mounting arm 130 is mounted on the main body portion 14 at a rearward side 14b thereof.

Mounting arm 30 and de-mounting arm 130 are preferably arranged such that both, when in a central position (i.e. not laterally displaced to either side) lie on the centre line 18 if the apparatus 10.

In preferred embodiments of the invention, the de-mounting arm 130, it's attachment to the main body portion 14 and is movement and operation, are substantially identical to the corresponding features of mounting arm 30 and hence these features and operational aspects will not be described further. In the drawings, features of the de-mounting arm are 130 are given the same reference number as corresponding features of the mounting arm 30, save for the addition of the prefix "1".

Similarly, a lifting device and support assembly and their associated features are also provided on de-mounting arm 130 and are numbered with the same number as the corresponding items on mounting arm 30, save for the addition of the prefix "1".

In preferred embodiments of the invention, the mounting arm is provided with a detection apparatus 70 at its distal end 36. Likewise, the de-mounting arm 130 is, in preferred embodiments, provided at its distal end with detection apparatus 170. The respective detection apparatus 70, 170 are selected and configured to detect the presence and location of the longitudinally extensive member when lying on the ground surface. The choice of particular detection apparatus is made in accordance with the particular circumstances of use of the apparatus 10 and may depend, for example, on the characteristics and construction of the longitudinally extensive member 12.

The terms "mounting" and "de-mounting" in connection with arms 30 and 130 are used herein primarily for the purposes of distinguishing between the respective arms 30 and 130 and as should not be taken as absolute. That is, the term "mounting" should not be taken as requiring that mounting arm 30 can function only for mounting the longitudinally extensive member to the apparatus 10 and the term "de-mounting" should not be taken as requiring that the de-mounting arm can function only for de-mounting the longitudinally extensive member from the apparatus. Such requirements may be seen as appropriate when the apparatus 10 is moving "forward" such as when trenching operations are actually being carried out. By comparison, when the apparatus 10 is reversing towards a fixed structure (such as a wind turbine foundation or base), "de-mounting" arm 130 is, in effect, at the forward part of the apparatus (with respect to the direction of motion) and may thus act to mount the longitudinally extensive member to the apparatus 10 while "mounting" arm 30 is, in effect, at the rearward part of the apparatus (with respect to the direction of motion) and may thus act to de-mount the longitudinally extensive member from the apparatus 10.

Similarly, the terms "forward" and "rearward" and linguistic and grammatical variations thereof relate to the direction of motion of the apparatus 10 when actually carrying out trenching operations, it thus being apparent that when the apparatus 10 is moving in reverse (such as when approaching a wind turbine base or foundation), the "forward" side of the apparatus 10 is at the rear with respect to the direction of motion. The forward direction of the apparatus 10 is indicated in the Figures by arrows marked "F" and the rearward or reverse direction is indicated by arrows marked "R".

For operation of the apparatus 10, generally the longitudinally extensive member is first laid (by means known in the art) on the ground surface, such as the sea bed, following at least approximately the intended path or course of the trench into which the longitudinally extensive member is to be laid. The apparatus 10 is then placed in its initial work position in which the apparatus 10 straddles the longitudinally extensive member. That is, the longitudinally extensive member passes between the ground contacting assemblies 16a1 and 16a2 and between the ground contacting assemblies 16b1 and 16b2.

Exact location of the apparatus 10 with respect to the longitudinally extensive member is not required. More specifically, there is no requirement for the longitudinally extensive member to be aligned with the centre line 18 of the apparatus 10.

With the apparatus 10 in its initial work position, the apparatus 10 may be operated to pick up and lift the longitudinally extensive member.

Initially, the location of the longitudinally extensive member 12 is determined. As noted above, the mounting arm 30 is provided at its distal end 36 with detection apparatus 70. To determine the location of the longitudinally extensive member, the mounting arm is moved from side to side about pivot 38 so that the detection apparatus 70 is moved in a scanning or sweeping motion. During that motion, detection apparatus 70 will pass above the longitudinally extensive member 12 and the location of said member is identified.

Figure 7:
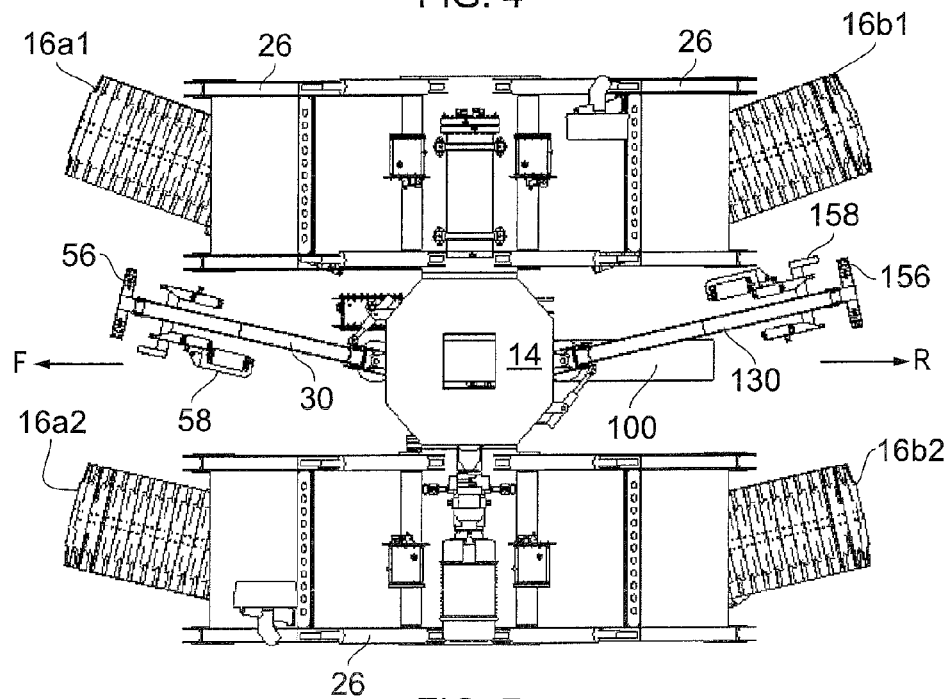
FIG. 7 is a plan view of the apparatus of FIG. 1, showing the apparatus in a condition for moving along a curved path in a second direction of curvature opposite in sense to that of FIG. 4.

FIG. 7 shows the mounting arm 30 when moved to the right (with respect to the forward direction F of apparatus 10), the position of mounting arm 30 in FIG. 7 representing the limit of movement of the mounting arm 30 in the rightward direction.

Figure 4:
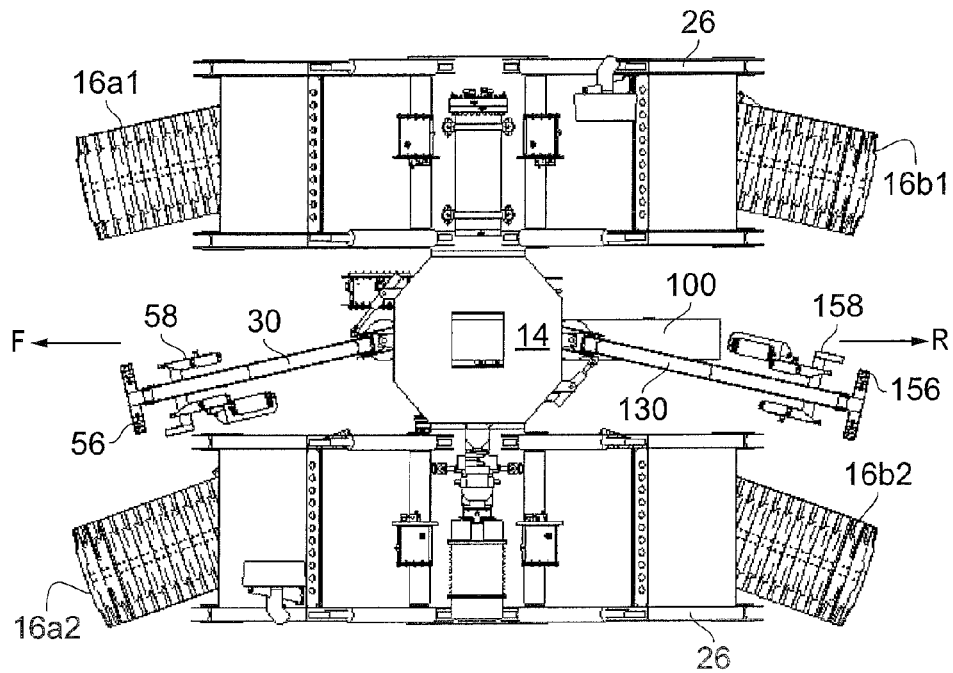
FIG. 4 is a plan view of the apparatus of FIG. 1, showing the apparatus in a condition for moving along a curved path in a first direction of curvature.

FIG. 4 shows the mounting arm 30 when moved to the left (with respect to the forward direction F of apparatus 10), the position of mounting arm 30 in FIG. 4 representing the limit of movement of the mounting arm 30 in the leftward direction.

Corresponding movements of the de-mounting arm 130 are also shown in FIGS. 4 and 7.

When the position of the longitudinally extensive member is determined the mounting arm 30 is moved about pivot 38 until the lifting device is located directly above the longitudinally extensive member (assuming that the mounting arm 30 is not already in such position).

If necessary, mounting arm 30 is lowered to allow lifting device 56 to engage the longitudinally extensive member, and the longitudinally extensive member is lifted by the lifting device 56.

The support assembly 58 is brought into its use position so that the longitudinal member is supported by and retained on mounting arm 30. Mounting arm 30 can then be moved so that the longitudinally extensive member is moved into alignment with the apparatus centre line 18.

A corresponding operation may preferably be performed at the rearward side of the apparatus 10 using the de-mounting arm 130 to locate and lift the longitudinally extensive member and to bring the longitudinally extensive member into alignment with the centre line 18 of the apparatus 10.

As noted above, the trench cutting device 100 also lies on the centre line 18 of the apparatus 10. The longitudinally extensive member is lifted by mounting arm 30, and preferably also by de-mounting arm 130 so that as the longitudinally extensive member passes through the apparatus 10 it is most preferably aligned with the centre line 18 of apparatus 10. The path of the longitudinally extensive member 12 through the apparatus 10 thus passes above the trench cutting device 100.

Because, during operation of the apparatus 10, the longitudinally extensive member passes above the trench cutting device 100, it is important to ensure that, during lifting of the longitudinal member (typically from the ground surface) to a position in which at least that part of the longitudinally extensive member which is within or below the main body lies along the centre line of the apparatus, (above the trench cutting device) the longitudinally extensive member does not contact or otherwise interfere with the trench cutting device. Such contact or interference could result in damage to the longitudinally extensive member and/or the trench cutting device 100.

In prior art apparatus, this problem has been avoided by constructing the trench cutting device 100 so that it can be moved out of the way. Typically, the longitudinally extensive member is arranged on the ground surface in alignment with the centre line of the apparatus and is lifted substantially vertically to its operational position. Thus, prior to such lift, the trench cutting device in the prior art apparatus is moved so that it does not occupy the vertical lifting path of the longitudinally extensive member and, following the lifting of the longitudinally extensive member, the trench cutting device is returned to its use position beneath the longitudinally extensive member. This prior art procedure is disadvantageous in terms of time, but more especially in terms of the mounting of the trench cutting device to the main body portion. Mounting of the trench cutting device so that it can be moved out of the way of the longitudinally extensive member during lifting thereof makes the connection of the trench cutting device to the main body portion less stiff which may adversely affect its trench cutting ability.

The present invention seeks to overcome these problems by mounting the trench cutting device in a fixed location (save for the movement of the trench cutting device from its stored to its use positions). More particularly, in preferred embodiments, the trench cutting device, in moving between use and stored positions, is allowed only translational up and down motion and/or rotation about a nominally horizontal axis which is transverse to the forward and reverse motion of the apparatus 10. Such construction allows the connection to the main body portion to be stiffer. This construction is simpler and may make the trench cutting device more effective. A consequence of such preferred constructions is that the trench cutting device is at all times intersected by a straight line descending nominally vertically form the normal in use position of the longitudinally extensive member as said member passes through or below the main body portion. Generally such vertical line will also intersect the centre line 18 of the apparatus 10.

Figure 3:
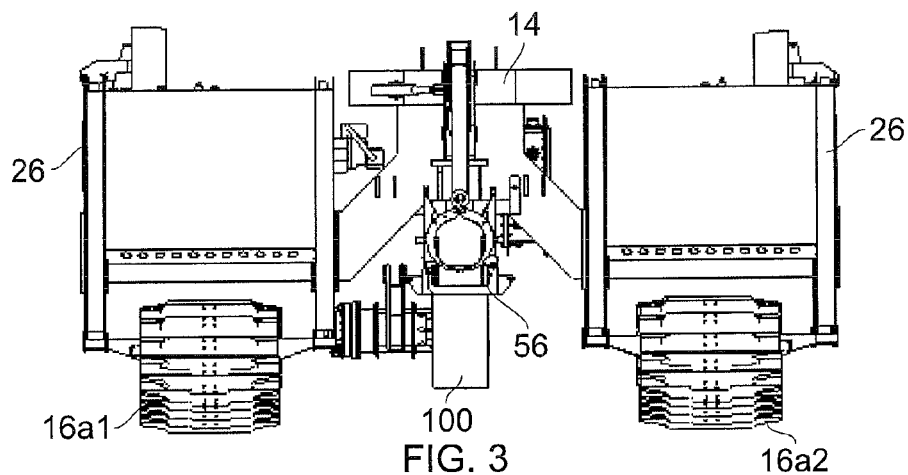
FIG. 3 is a forward view of the apparatus of FIG. 1.

The requirement to provide a trench cutting device which can be displaced out of the lifting path of the longitudinally extensive member is obviated in accordance with the present invention because mounting arm 30, and preferably also de-mounting arm 130, are movable laterally, as described above. Thus the longitudinally extensive member can be lifted, typically from the ground surface, to its position of use in alignment with the centre line 18 and above the trench cutting device 100 (note FIG. 3) along a lifting path which avoids contact with the trench cutting device 100. In other words, the mounting arm 30 and the de-mounting arm 130 lift the longitudinally extensive member around the static trench cutting device 100, usually along a non-linear path, taking advantage of the ability of mounting arm 30 and de-mounting arm 130 to execute lateral movements.

When the longitudinally extensive member has been mounted to the apparatus 10, the apparatus 10 is ready to begin trenching operations if required.

During trenching operations, the longitudinally extensive member typically is initially resting on the ground surface, such as the seabed. As the apparatus 10 moves forwards, the longitudinally extensive member rises upwards and passes over the support assembly 58 of the mounting arm 30. Support assembly 58 comprises a low friction surface or rollers. The longitudinally extensive member then passes through the apparatus 10, through or below main body portion 14 and above the trench cutting device 100. The trench cutting device 100 is at this time active in forming the trench into which the longitudinally extensive member is to be laid. The longitudinally extensive member then passes over the support assembly 158 of the de-mounting arm 130 and is directed by the de-mounting arm 130 into the newly cut trench. The longitudinally extensive member may be concurrently or subsequently buried in the trench by suitable means known in the art.

During trenching operations, preferably the mounting arm 30 and the de-mounting arm 130 remain in alignment with centre line 18. Thus the longitudinally extensive member is also maintained in alignment with centre line 18 of the apparatus 10. The mounting arm 30 and the de-mounting arm 130 may be actively controlled to maintain the respective arms 30, 130 in alignment with the centre line 18. Of course, where trenching operations require the trench to follow a curve of small turning radius it may not be possible to maintain the mounting arm 30 and de-mounting arm 130 in alignment with the centre line 18 as the small radius curve is negotiated by apparatus 10. In this case, lateral displacement of the respective arms 30, 130 about pivots 38, 138 accommodates the necessary curvature of the longitudinally extensive member.

In some instances, before trenching commences it is necessary for the trenching apparatus 10 to move in reverse along the path of the longitudinally extensive member to a predetermined point. An important example is the case where the longitudinally extensive member is a cable which has previously been attached to a wind turbine. Here it is important that as much of the cable as possible is laid in the trench cut by the apparatus 10, in order to minimise the extent of un-trenched (and therefore unprotected) cable. Unprotected cable must be given protection by other (known) means which increases cost and delay. The apparatus 10 must therefore reverse to a point as close as possible to the wind turbine before commencing trenching operations.

In particular at locations close to the wind turbine base or foundation, the longitudinally extensive member (e.g. a cable) may include curves of small radius. It is important that the longitudinally extensive member is adequately and safely supported in the apparatus 10 as the apparatus 10 traverses such tight curves while reversing towards the wind turbine base. To this end, low friction surfaces are provided on the support assembly 58, 158, or, more preferably, the support assembly 58, 158 comprise rollers.

In traversing such small radius curves while reversing, notably when approaching a wind turbine base, the curvature of the longitudinally extensive member (e.g. a cable) is accommodated by lateral movement of the mounting arm 30 and de-mounting arm 130.

FIGS. 4 to 9 illustrate an embodiment of the apparatus 10 of the invention in configurations for accommodating small radius curves.

Figure 5:
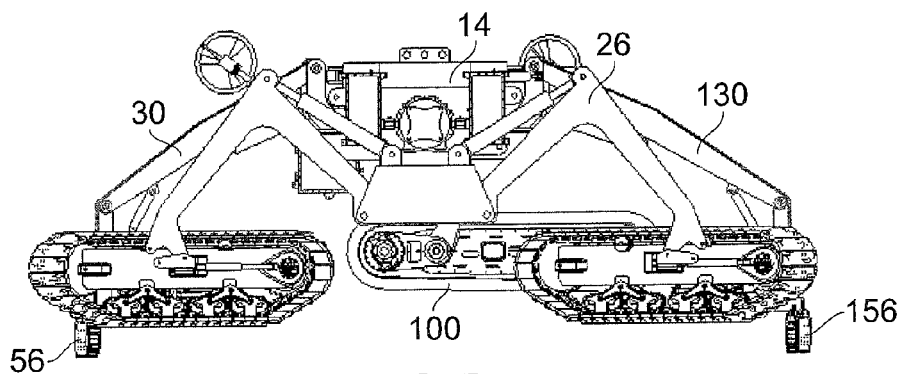
FIG. 5 is a side view of the apparatus in the condition shown in FIG. 4.
Figure 6:
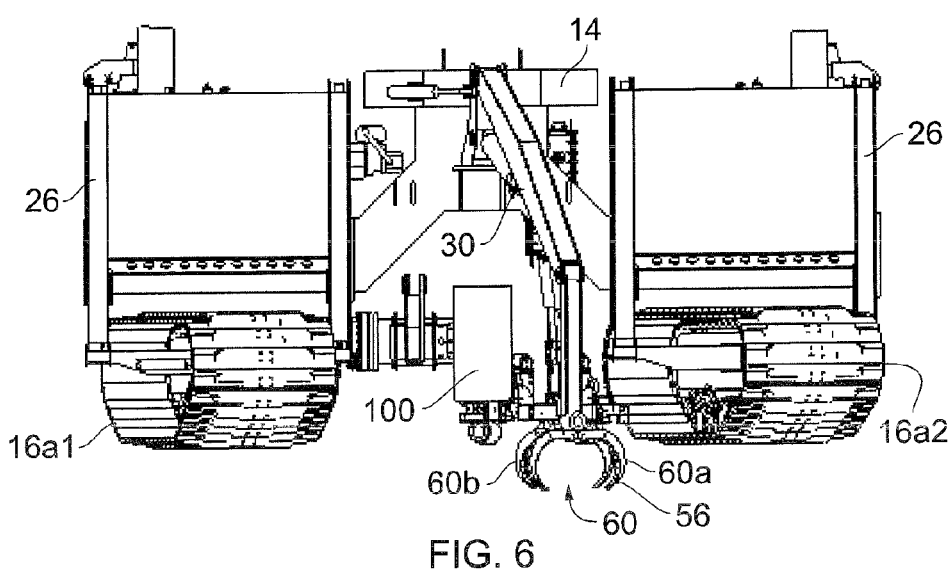
FIG. 6 is a forward view of the apparatus of FIG. 4.

FIGS. 4 to 6 show the apparatus 10 of the invention configured for traversing a small radius curve to the left (with reference to the forward direction). Mounting arm 30 and de-mounting arm 130 are displaced to the left with respect to the centre line 18 and the forward direction of motion.

Figure 8:
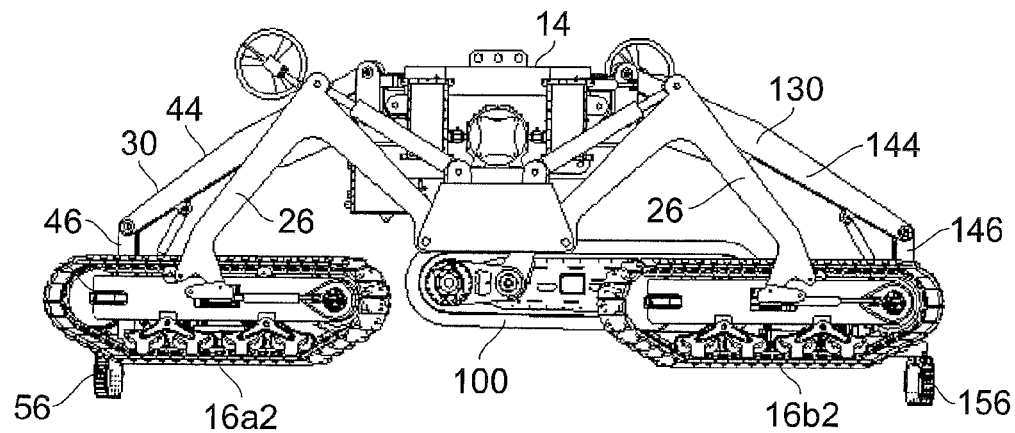
FIG. 8 is a side view of the apparatus of FIG. 7.
Figure 9:
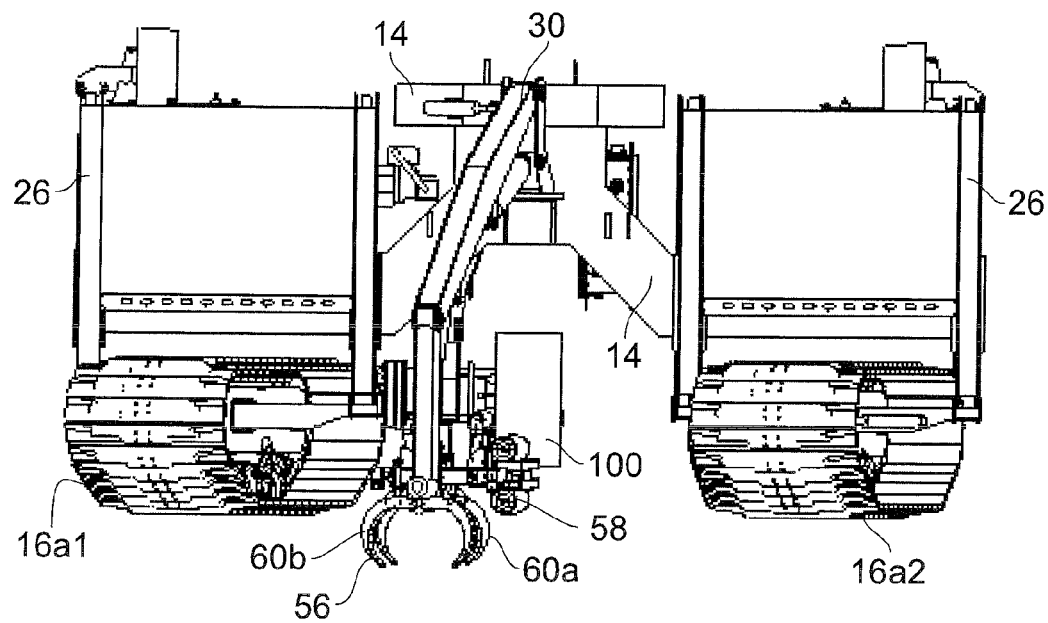
FIG. 9 is a forward view of the apparatus of FIG. 7.

FIGS. 7 to 9 show the apparatus 10 of the invention configured for traversing a small radius curve to the right (with reference to the forward direction). Mounting arm 30 and de-mounting arm 130 are displaced to the right with respect to the centre line 18 and the forward direction of motion.

In variations of the invention, the apparatus of the invention may be deployed with the longitudinally extensive member already located or mounted thereon. That is, the initial steps of locating and picking up the longitudinal member are, in this case, not necessary. The mounting and de-mounting arms nevertheless function to accommodate the longitudinally extensive member when passing through the apparatus and more especially to ensure the correct positional arrangement of the longitudinally extensive member within the apparatus, preferably along the centre line. The respective arms also accommodate curvature of the longitudinally extensive member as the apparatus negotiates tight (smaller radius) curves in the path of the longitudinally extensive member, notably when approaching a fixed structure such as a wind turbine.

It is also apparent from FIGS. 4 to 9 that the respective ground contacting assemblies are turned from their straight ahead position to positions appropriate for steering the apparatus 10 in the desired (right or left) direction.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An apparatus for manipulating a longitudinally extensive member comprising:
a main body portion;
ground contacting assemblies on which the main body portion is mounted, the ground contacting assemblies being operable for conveying the apparatus over a ground surface;
a trench cutting device;
a mounting arm mounted directly or indirectly to the main body portion; and
a de-mounting arm mounted directly or indirectly to the main body portion opposite the mounting arm;
each arm having a proximal end arranged proximate the main body portion and a distal end arranged distal from the main body portion, the distal end being operatively laterally moveable with respect to the main body portion between a first limit position towards a first side of the apparatus and a second limit position towards an opposite second side of the apparatus and wherein a lifting device configured to lift, and a support assembly configured to support, the longitudinally extensive member are mounted on the mounting arm proximate the distal end thereof;
wherein the support assembly is pivotally connected to the lifting device via the mounting arm, and moveable between a use position in which the support assembly is configured for supporting the longitudinally extensive member and a non-use position in which the support assembly does not interfere with the operation of the lifting device.

2. The apparatus of claim 1 further comprising a detection apparatus for determining the location of the longitudinally extensive member provided on the mounting arm.

3. The apparatus of claim 2, wherein the detection apparatus for determining the location of the longitudinally extensive member is selected from the group comprising visual apparatus, audio apparatus, an inductive apparatus and magnetic apparatus.

4. The apparatus of claim 2, wherein the detection apparatus for determining the location of the longitudinally extensive member is selected from the group consisting of a visual apparatus, an audio apparatus, and an inductive apparatus.

5. The apparatus of claim 2, wherein the detection apparatus for determining the location of the longitudinally extensive member is selected from the group consisting of a camera, sonar, search coils and a magnetic apparatus.

6. The apparatus of claim 1, wherein a detection apparatus for determining the location of the longitudinally extensive member is provided on the de-mounting arm.

7. The apparatus of claim 1, wherein in use of the apparatus the longitudinal member is arranged to pass through or below the main body portion and substantially vertically above the trench cutting device.

8. The apparatus of claim 1, wherein the trench cutting device is moveable between a stored position in which it is spaced from the ground surface and one or more use positions in which the trench cutting device is operable to form a trench.

9. The apparatus of claim 8, wherein in use of the apparatus the longitudinal member is arranged to pass through or below the main body portion and substantially vertically above the trench cutting device; and
wherein the trench cutting device when in any use or stored position lies on a straight line between a portion of the trench located below the main body portion and the position below or in the main body portion in which the longitudinal member is located in use.

10. The apparatus of claim 1, wherein the lifting device comprises a grab, hook or the like which is configured to engage and lift the longitudinal member.

11. The apparatus of claim 1, wherein the support assembly comprises a low friction surface configured for contacting the longitudinally extensive member.

12. The apparatus of claim 1, wherein the support assembly comprises one or more rollers which support the longitudinally extensive member.

13. The apparatus of claim 1, wherein the mounting arm is mounted at its proximal end by a pivot, whereby the mounting arm can operatively move with respect to the main body portion about a nominally vertical axis.

14. The apparatus of claim 1, wherein the de-mounting arm is mounted at its proximal end by a pivot, whereby the de-mounting arm can operatively move with respect to the main body portion about a nominally vertical axis.

15. A method of manipulating a longitudinally extensive member, the method comprising:
providing a trenching apparatus comprising a main body portion, ground contacting assemblies on which the main body portion is mounted, the ground contacting assemblies being operable for conveying the apparatus over a ground surface, a trench cutting device, a mounting arm mounted directly or indirectly to the main body portion and having a proximal end arranged proximate the main body portion and a distal end arranged distal from the main body portion, and a demounting arm mounted directly or indirectly to the main body portion opposite the mounting arm and having a proximal end arranged proximate the main body portion and a distal end arranged distal from the main body portion;
locating the trenching apparatus over the longitudinally extensive member;
moving the mounting arm so that the distal end thereof is disposed directly above the longitudinally extensive member;
moving the de-mounting arm so that the distal end thereof is disposed directly above the longitudinally extensive member;
using the mounting arm and the de-mounting arm to manipulate the longitudinally extensive member into a desired position with respect to the trenching apparatus; and
providing on the mounting arm proximate the distal end thereof a lifting device configured to lift, and a support assembly configured for supporting the longitudinally extensive member, the support assembly being pivotally connected to the lifting device via the mounting arm, and being moveable between a use position in which the support assembly is configured for supporting the longitudinally extensive member and a non-use position in which the support assembly does not interfere with the operation of the lifting device, and moving the support assembly from the non-use position to the use position when the longitudinally extensive member has been lifted by the lifting device.

16. The method of claim 15, wherein the mounting arm is provided with an apparatus for determining the location of the longitudinally extensive member; and
wherein the step of moving the mounting arm includes determining the location of the longitudinally extensive member using the apparatus for determining the location of the longitudinally extensive member.

17. The method of claim 15, wherein the mounting arm is provided with a lifting device; and
   wherein the step of manipulating the longitudinally extensive member includes engaging the longitudinally extensive member by the lifting device and lifting the longitudinally extensive member with the lifting device.

18. The method of claim 15, wherein the step of manipulating the longitudinally extensive member includes the step of lifting the longitudinally extensive member and moving the mounting arm such that the distal end of the mounting arm and the longitudinally extensive member carried by the mounting arm are aligned with a centre line of the trenching apparatus.

19. The method of claim 15, wherein the step of manipulating the longitudinally extensive member includes lifting the longitudinally extensive member along a path configured to prevent contact or interference between the longitudinally extensive member and the trench cutting device.

20. The method of claim 19, wherein the path is non-linear.

21. The method of claim 15, wherein the step of manipulating the longitudinally extensive member includes lifting the longitudinal member from an initial position on the ground surface to a use position where the distal end of the mounting arm and the longitudinally extensive member carried by the mounting arm are aligned with a centre line of the trenching apparatus, the lifting path of the longitudinally extensive member between the initial and use positions being configured to prevent contract or interference between the longitudinally extensive member and the trench cutting device.

22. The method of claim 15, wherein the steps employing the mounting arm are correspondingly executed with the de-mounting arm.

23. The method of claim 22, wherein the corresponding execution comprises simultaneous or contemporaneous use for the mounting and de-mounting arms.

24. A method of laying a longitudinally extensive member in a trench comprising:
   identifying the location of a longitudinal member on a ground surface, wherein the longitudinal member has a forwardly extending portion and a rearwardly extending portion;
   moving a mounting arm of a trenching machine to a lifting position and;
   lifting the longitudinally extensive member with a lifting device mounted on the mounting arm;
   moving, when the longitudinally extensive member has been lifted by the lifting device, a support assembly mounted on the mounting arm and pivotally connected to the lifting device via the mounting arm from a non-use position in which the support assembly does not interfere with the operation of the lifting device to a use position in which the support assembly supports the longitudinally extensive member;
   adjusting the position of the mounting arm such that the lifted part of the longitudinally extensive member is aligned with a centre line of the trenching machine;
   cutting the trench with a trench cutting device mounted on the trenching machine; and
   depositing the longitudinally extensive member in the trench;
   wherein the trenching machine comprises two mounting arms, a forward mounting arm and a rearward mounting arm; and wherein:
      the step of moving the mounting arm comprises moving the forward and rearward mounting arms to the lifting position;
      the step of lifting the longitudinally extensive member comprises lifting the forwardly extending portion of the longitudinally extensive member with the forward mounting arm and lifting the rearwardly extending portion of the longitudinally extensive member with the rearward mounting arm;
      the step of adjusting the position of the mounting arm comprises adjusting the position of the respective mounting arms such that the lifted part of the longitudinally extensive member is aligned with a center line of the trenching machine; and
      the step of depositing the longitudinally extensive member comprises depositing the longitudinally extensive member in the trench with the rearward mounting arm.

25. The method of claim 24, wherein the lifting position is determined by use of a detection apparatus for determining the location of the longitudinally extensive member.

* * * * *